United States Patent [19]

Sugano

[11] Patent Number: 4,729,265
[45] Date of Patent: Mar. 8, 1988

[54] SHIFT SHOCK SUPPRESSION ARRANGEMENT FOR AUTOMOTIVE AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 816,154

[22] Filed: Jan. 3, 1986

[30] Foreign Application Priority Data

Jan. 9, 1985 [JP] Japan .................................. 60-787
Jan. 11, 1985 [JP] Japan .................................. 60-2866

[51] Int. Cl.$^4$ ............................................. B60K 41/24
[52] U.S. Cl. ............................................ 74/868; 74/867
[58] Field of Search ................ 74/868, 867, 869, 863, 74/865

[56] References Cited

U.S. PATENT DOCUMENTS

| 3,733,927 | 5/1973 | Uozumi et al. | 74/868 |
| 3,842,693 | 10/1974 | Oberpichler | 74/868 |
| 4,125,038 | 11/1978 | Hiramatsu | 74/865 |
| 4,161,895 | 7/1979 | Ushijima | 74/867 |
| 4,274,307 | 6/1981 | Iwanaga et al. | 74/868 |
| 4,274,308 | 6/1981 | Iwanaga et al. | 74/868 |
| 4,445,401 | 5/1984 | Ishimaru | 74/867 |
| 4,474,084 | 10/1984 | Sugano et al. | 74/867 |
| 4,580,466 | 4/1986 | Iwanaga | 74/868 |

FOREIGN PATENT DOCUMENTS

| 2029525 | 3/1980 | United Kingdom | 74/768 |
| 2028937 | 3/1980 | United Kingdom . | |
| 2031533 | 4/1980 | United Kingdom . | |
| 2061422 | 5/1981 | United Kingdom . | |
| 2072772 | 10/1981 | United Kingdom . | |
| 2147669 | 5/1985 | United Kingdom . | |

OTHER PUBLICATIONS

Nissan Motor Co., Ltd., 1975, Service Manual, "Nissan Automatic Transmission Model 3N71B".

Primary Examiner—Leslie Braun
Assistant Examiner—David Novais
Attorney, Agent, or Firm—Schwartz, Jeffery, Schwaab, Mack, Blumenthal & Evans

[57] ABSTRACT

In order to obviate shift shock during shifting between second and third gears in a transmission wherein a front clutch and a band brake having apply and release chambers, an accumulator is connected to the circuit via which line pressure is supplied from a 2-3 shift valve in a manner that the engagement/release of the two friction elements is staged in a manner that reduces sharp fluctuations in the output shaft torque.

8 Claims, 12 Drawing Figures

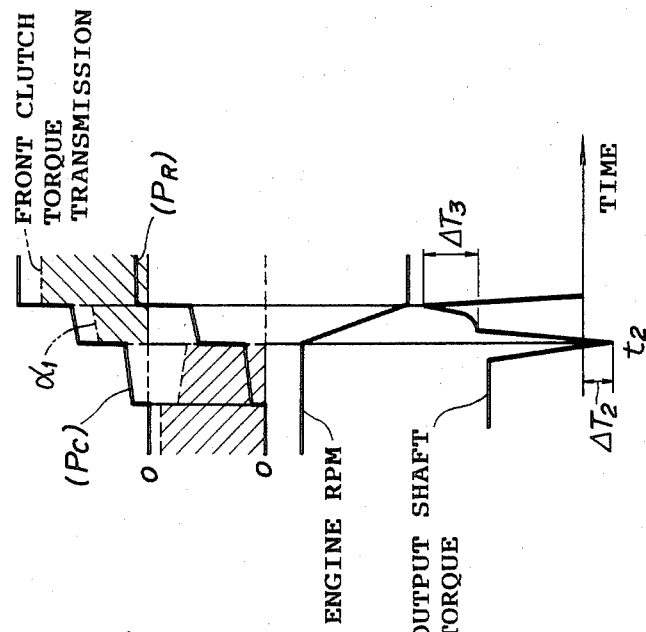
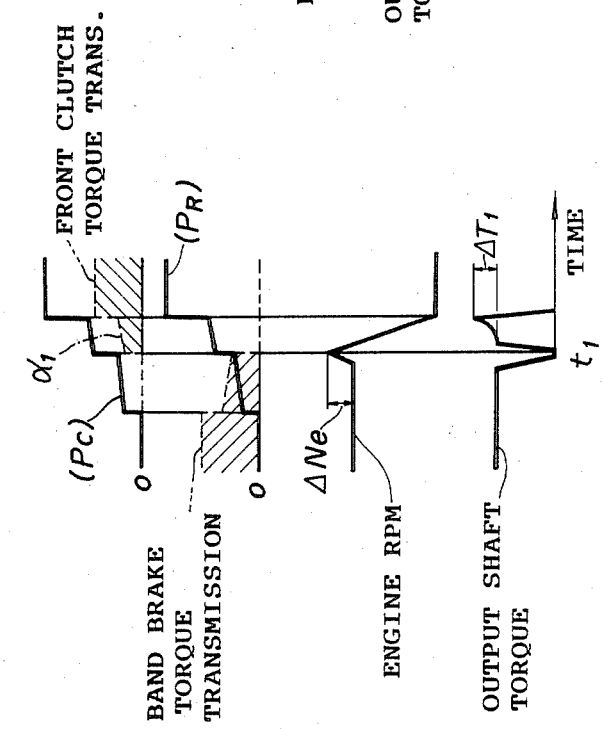

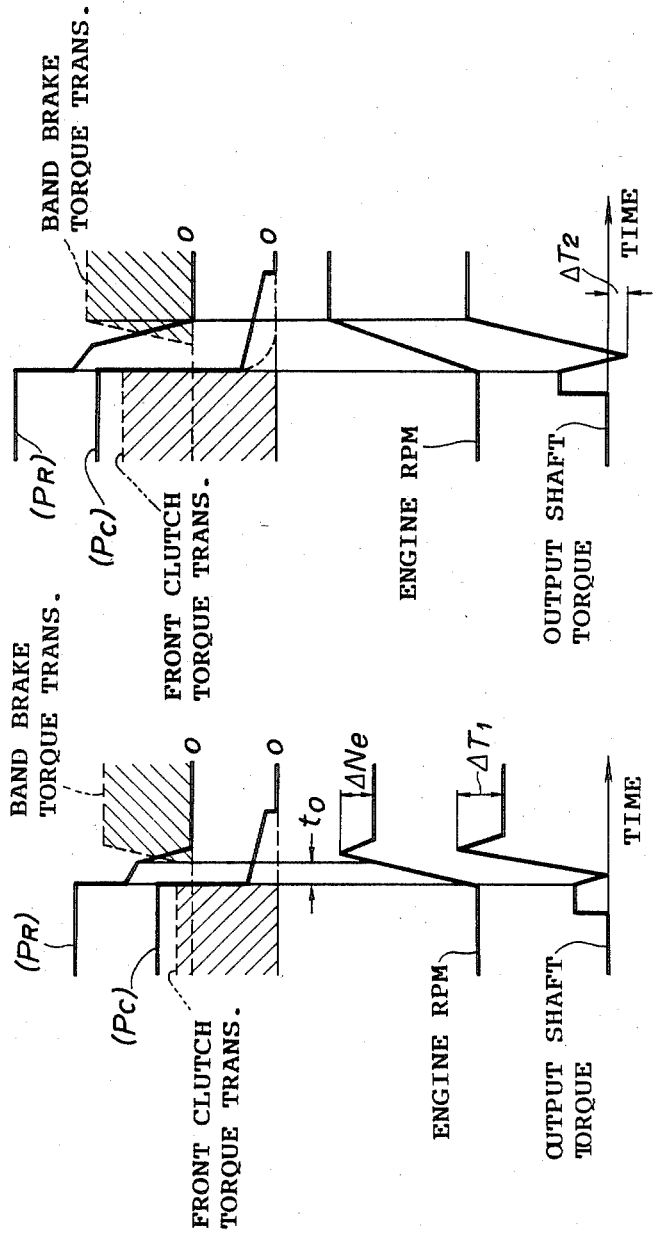

LOW THROTTLE OPENING

HIGH THROTTLE OPENING

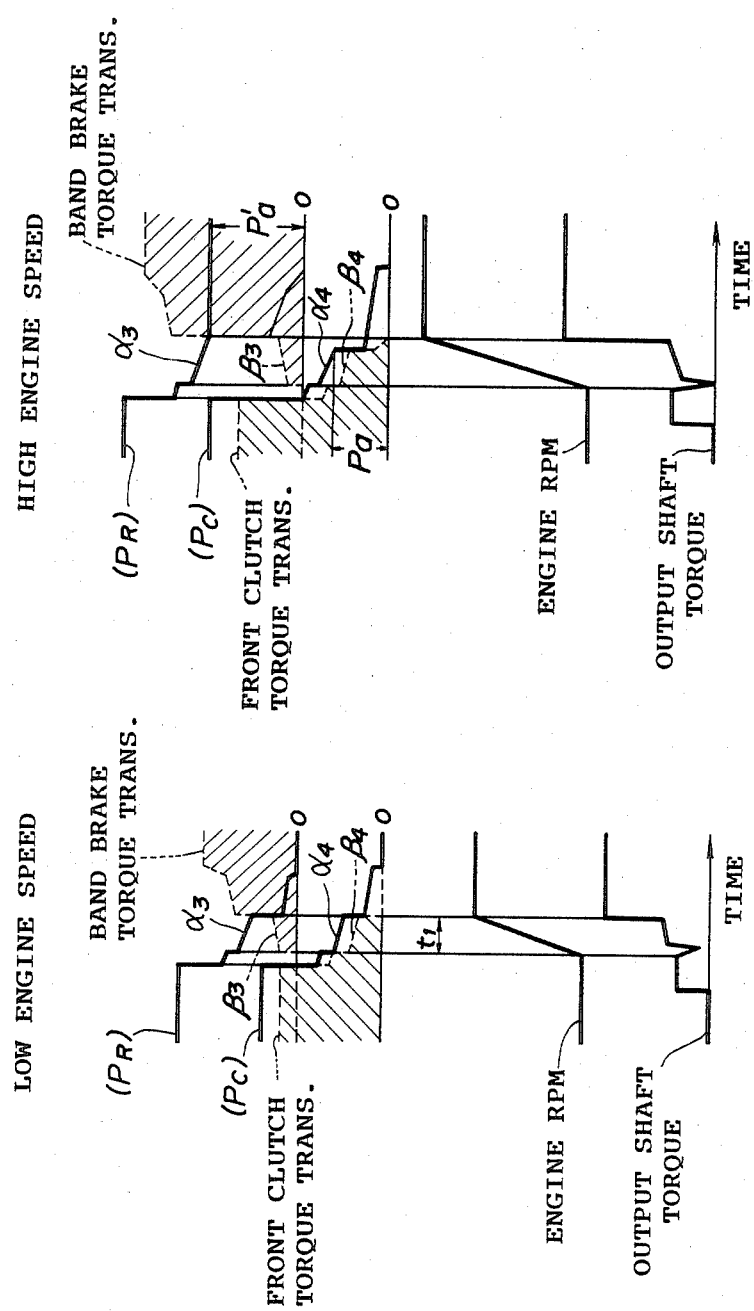

SHIFT SHOCK SUPPRESSION ARRANGEMENT FOR AUTOMOTIVE AUTOMATIC TRANSMISSION

BACKGROUND OF THE THE INVENTION

1. Field of the Invention

The present invention relates generally to an automatic automotive transmission and more specifically to an arrangement therefor which attenuates shift shock over a wide range of engine load and speed.

2. Description of the Prior Art

FIG. 1 shows a portion of a prior art transmission disclosed in detail in SERVICE MANUAL Nissan Automatic Transmission Model 3N71B. This section of the transmission as shown, includes a front clutch 1, a band brake 2 and a 2-3 shift valve 3 which are interconnected as shown. The disclosure of the above mentioned service manual is hereby incorporated by reference thereto.

The band brake 2 is arranged to have a servo 4 which includes an apply chamber 6 and a release chamber 8. The stepped piston 10 which is disposed between the opposed chambers 6, 8 is arranged so that the surface area exposed to the release chamber 8 is greater than that exposed to the apply chamber 6 so that even if both chambers are applied with pressures of equal magnitude (eg. both chambers are supplied with line pressure) the brake will assume a released condition upon pressurization of the release chamber 8.

The 2-3 shift valve 3 includes a spool 12 which when in the downshift position (upper half section) connects port 14 with a drain 16 while in the upshift position (lower half section) connects port 14 with a port 18 which is supplied with line pressure. Hence, while the transmission is conditioned to provide 2nd speed and shift valve 3 is in its downshift position, chamber 20 of the forward clutch servo 22 and the release chamber 8 of the band brake servo 4 are depressurized. This induces the front clutch 1 to assume a released condition while the band brake 2 is applied due pressure being applied only to the apply chamber 6.

Upon the shift valve 3 assuming its upshift position under the influence of governor ($P_G$) and throttle ($P_N$) pressures, the transmission is condition to assume 3rd speed by the application of line pressure ($P_L$) to chambers 20 and 8 which applies the front clutch 1 and releases the band brake 2.

In this arrangement a flow restricting orifice 24 is interposed between port 14 and chambers 8 and 20. In actual fact, two orifices are disposed in the conduits at locations indicated schematically by the phantom boxes. However, for simplicity of illustration only one orifice is shown and is illustrated in a position wherein the effect of the above mentioned two is provided.

This arrangement however, has suffered from the drawbacks that as shown in FIG. 2 when the transmission upshifts at low engine throttle opening a shift shock is encountered. The reason for this is that when the engine throttle opening is small the band brake 2 tends to be released relatively rapidly as compared with the engagement of the front clutch 1 so that at time t1 the transmission assumes a condition in which neither of 2nd or 3rd gears are established and the engine tends to race as indicated by $\Delta Ne$ due to the sudden 'quasi neutral' condition which occurs. This induces a peak in the torque applied to the output shaft of the transmission as indicated by $\Delta T1$ and hence results in the generation of shift shock upon a 2-3 upshift.

On the other hand, when a 2-3 upshift occurs at a high throttle opening, the release of the band brake 2 tends to be delayed with respect to the engagement of front clutch 1 so that at time t2 a negative torque ($\Delta T2$) tends to be applied to the output shaft (not shown) due to slight locking of the transmission as shown in FIG. 3. This induces a subsequent sharp peak ($\Delta T3$) in the output shaft torque which causes shift shock.

FIG. 4 shows a second example of prior art. This arrangement is disclosed in detail in SERVICE MANUAL Nissan Automatic Transmission Model RN 3F01A. This arrangement differs from the one shown in FIG. 1 in that only the communication between port 14 and the release chamber 8 of the band brake 2 is restricted by a flow restriction 26. The reason for this provision is to enable the slow engagement of the band brake 2 with respect to the release of the front clutch 1 in an effort to smooth the shift by enabling the engine to race slightly in a manner which brings the engine speed up to a level which matches that which will result after the shift is completed.

However, this arrangement has encountered the drawback that during downshifting from second to third gear at low vehicle speed, due to the low engine speed the centrifugal force acting on front cluch 1 is correspondingly low, whereby the force holding the hydraulic fluid in chamber 20 tends to be very low and the depressurization thereof essentially instantaneous thus instantly reducing the torque transmission thereby. However, at this time the engagement characteristics of the band brake 2 are not effected by centrifugal force (engine speed) and are determined only by orifice 26.

Under these conditions, the engine tends to race more than required over a period to and induce an engine speed peak as indicated by $\Delta Ne$ in FIG. 5. As a result, a shift shock generating peak ($\Delta T1$) in the output shaft torque tends to occur.

On the other hand, in the event that a 3-2 downshift occurs a high vehicle speed the release charactertics of the front clutch 1 are influenced by the increased amount of centrifugal force acting on the device whereby the band brake 2 tends to engage more rapidly (with respect to the release of the front clutch) and induces the situation wherein a slight lock-up of the transmission occurs. This causes the output shaft torque to drop sharply and even become negative as shown by $\Delta T2$ in FIG. 6 and induce shift shock.

SUMMARY OF THE INVENTION

It is an object of the present invention to provide a simple arrangement which overcomes the shift shock problems encountered in the above described transmission arrangments.

In brief, the above objects are achieved by an arrangement wherein in order to obviate shift shock during shifting between second and third gears in a transmission wherein a front clutch and a band brake having apply and release chambers; an accumulator is connected to the fluid circuit via which line pressure is supplied from a 2-3 shift valve in a manner that the enagagement/release of the two friction elements is staged in a manner that reduces sharp fluctuations in the output shaft torque.

More specifically, the present invention takes the form of a transmission for an automotive vehicle which is characterized by: a first friction element, the first friction element having a first chamber which when supplied with hydraulic pressure causes the first friction element to assume an engaged condition; a second friction element, the second friction element having a second chamber which when supplied with hydraulic pressure induces the second friction element to assume a released condition; the transmission being arranged so that a first speed ratio is produced when the first and second friction elements are released and engaged respectively, and a second speed ratio is produced when the first and second friction elements are engaged and released respectively; a shift valve, the shift valve having a valve element which establishes communication between a source of hydraulic pressure and a port when in an upshift position and communication between the port and a drain when in a downshift position; a fluid circuit which interconnects the port and the first and second chambers; an accumulator having a third chamber in unrestricted fluid communication with the second chamber; and a flow restrictor fluidly disposed in the fluid circuit between the port and the second chamber.

BRIEF DESCRIPTION OF THE DRAWINGS

The features and advantages of the arrangement of the present invention will become more clearly appreciated from the following description taken in conjunction with the accompanying drawings wherein:

FIGS. 2 and 3 are timing charts depicting the shift characteristics of the arrangement shown in FIG. 1 under low and high throttle opening engine operation, respectively;

FIGS. 5 and 6 are timing charts depicting the shift shock generation which plagues the FIG. 4 arrangement;

FIGS. 11 and 12 are timing charts which depict the shift characteristics obtained with the second embodiment.

DETAILED DESCRIPTION OF THE PREFERRED EMBODIMENTS

Figure 7:
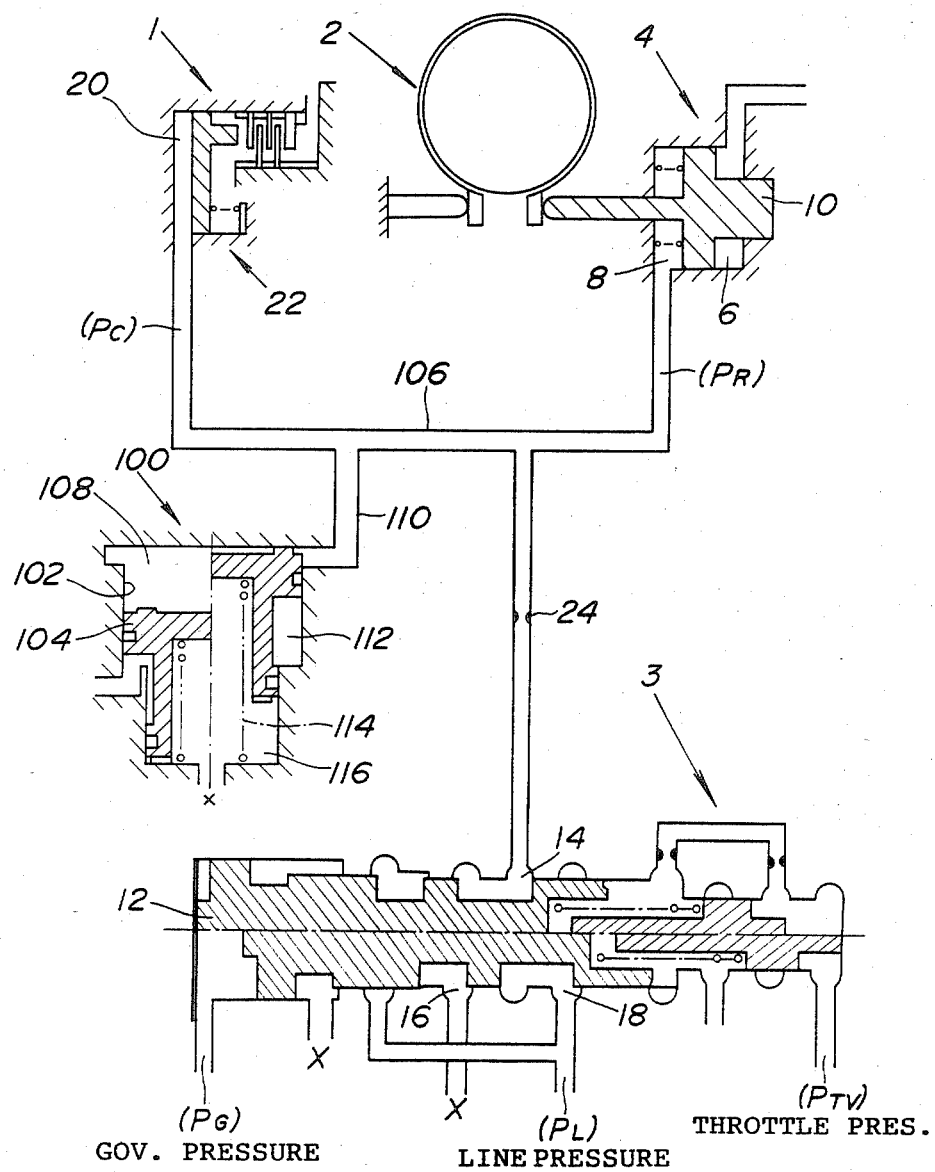
FIG. 7 shows a first embodiment of the present invention.

FIG. 7 shows a first embodiment of the present invention. In this arrangement an accumulator 100 is added to an arrangement which is otherwise essentially the same as the arrangement shown in FIG. 1. Accordingly, the same numerals will be used to denote like elements and a redundant description thereof be omitted for brevity. The accumulator 100 in this embodiment includes a stepped bore 102 in which a stepped piston 104 is reciprocatively disposed. The fluid circuit 106 which interconnects the 2-3 shift valve with the front clutch 1 and band brake 2 is arranged to communicate with a variable volume chamber 108 via conduit 110.

In this embodiment the arrangement of the orifice 24 in the circuit 106 is such as to permit unrestricted communication between chamber 108 and chambers 8 and 20.

A second variable volume chamber 112 is defined in the stepped bore 102. This chamber is supplied with a control pressure-for example line pressure (however, it is within the scope of the present invention to utilize a different pressure such as governor pressure, throttle pressure or the like under the instance that such is effective.).

Due to the stepped nature of the piston 104 the effective surface area of the piston exposed to chamber 112 is less than that exposed to chamber 108 so that upon chamber 108 being supplied with line pressure due to the upshifting of the 2-3 shift valve 3 the piston 104 will be driven down against the combined bias of the pressure in chamber 112 and the spring 114 disposed in a third chamber 116 defined in the stepped bore. It will be noted that in this embodiment chamber 116 is drained.

Figure 8:
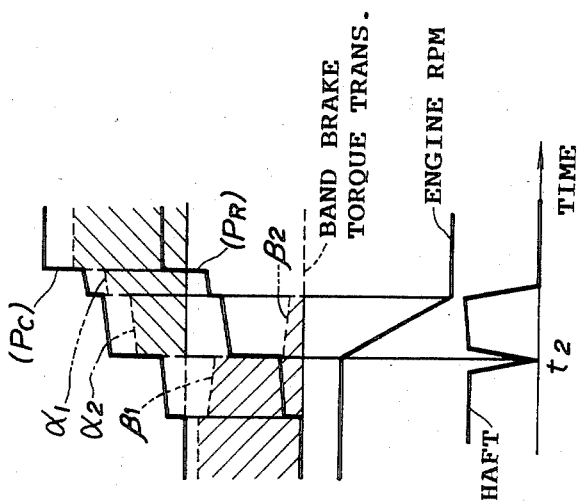
FIGS. 8 and 9 are timing charts showing the shift characteristics provided by the first embodiment.
Figure 9:
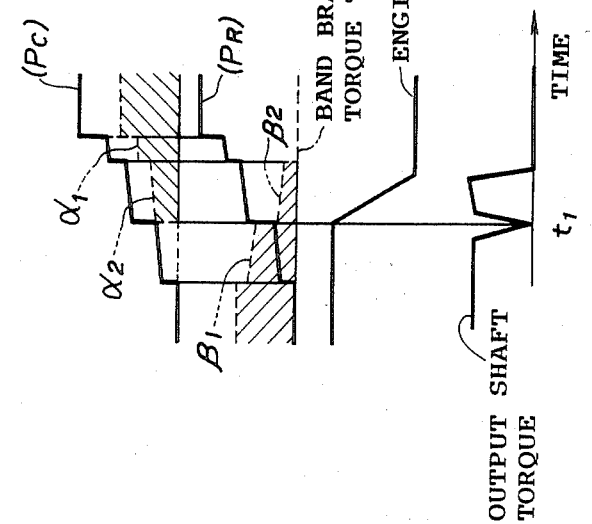

The operation of this device is shown in FIGS. 8 and 9. FIG. 8 shows the shift shock suppressing characteristics when a 2-3 upshift is effected at low throttle opening. As will be appreciated that upon the upshift line pressure is fed into the fluid circuit 106 via flow restriction 24. This pressure is delivered to chambers 8, 20 and 108. Due to the provision of the accumulator 100 pressure ($P_C$) develops in a staged manner as shown, which in turn causes the number of stages with which torque transmitted by the forward clutch develops to increase. Viz., an additional stage or level $\alpha 2$ occurs. The release of the band brake is effected in a similar manner. That is to say, the pressure which develops in the release chamber 8 of the band brake servo 4 develops in a manner as shown which induces first and second stages ($\beta 1$ and $\beta 2$) in the torque transmission reduction characteristics. As a result the sudden undesired 'quasi' neutral state of the transmission does not occur hence eliminating the racing which induces the shift shock in the FIG. 1 prior art.

Figure 1:
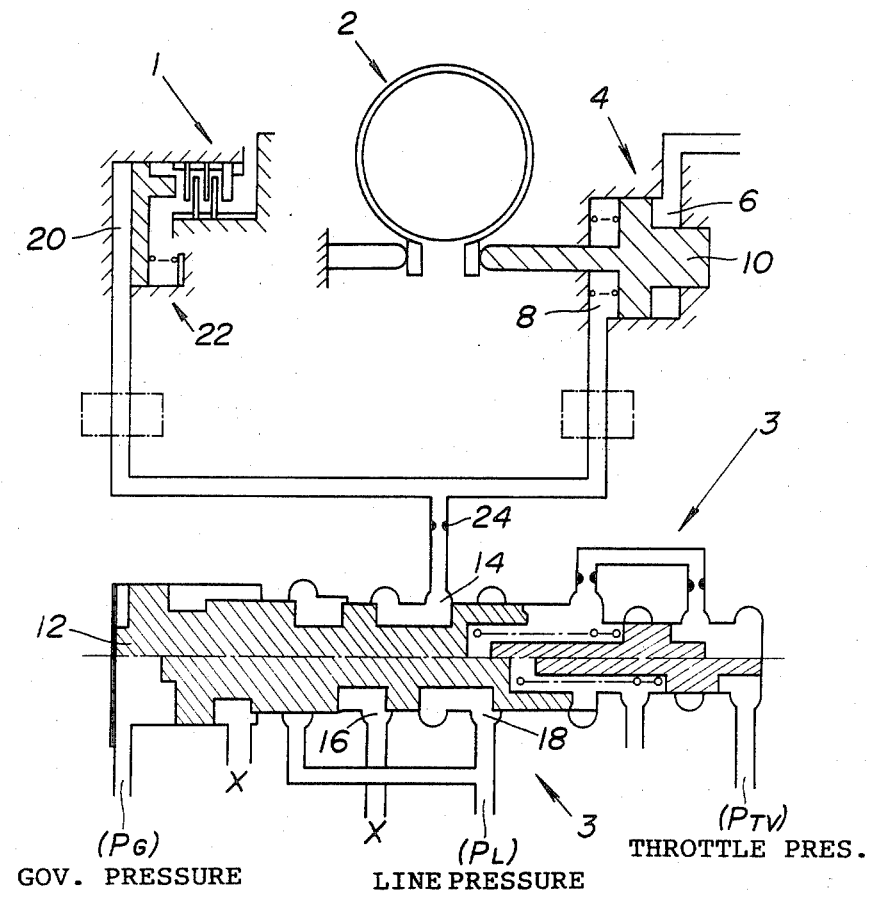
FIG. 1 shows a first of the prior art arrangements described in the opening paragraphs of the instant disclosure.
Figure 4:
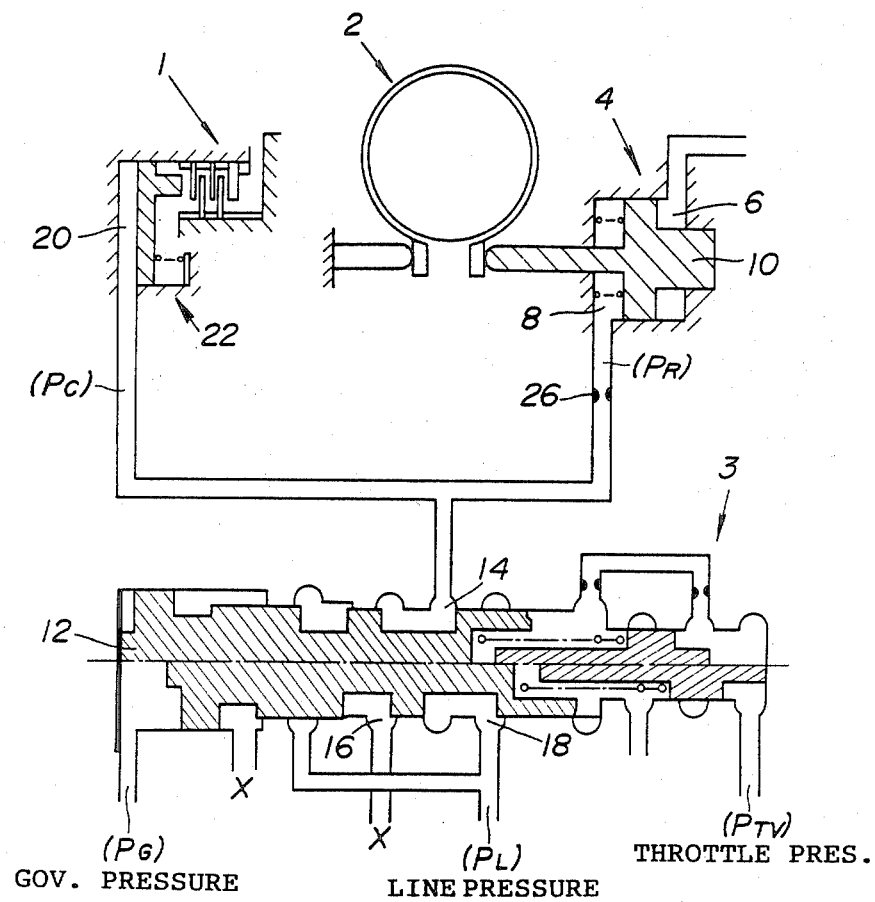
FIG. 4 shows the second of the two prior art arrangements discussed hereinbefore.

On the other hand in the event that a 2-3 upshift takes place at wide open throttle for example, the accumulator 100 modifes the pressure development in chambers 8 and 20 in a manner that under these circumstances again the stages in the torque transmission characteristics by the front clutch increases (viz., includes stage $\alpha 2$) while the torque transmission characteristics of the band brake 2 are such as reduce stagewise ($\beta 1$, $\beta 2$) whereby the momentary partial locking of the tranmission does not take place and the output shaft torque does not fluctuate to the point of becomming negative as in the case of the FIG. 1 prior art.

It will be noted that the height of the levels $\alpha 2$ and $\beta 2$ can be varied by changing the design (dimensions etc.) of the accumulator 100.

Figure 10:
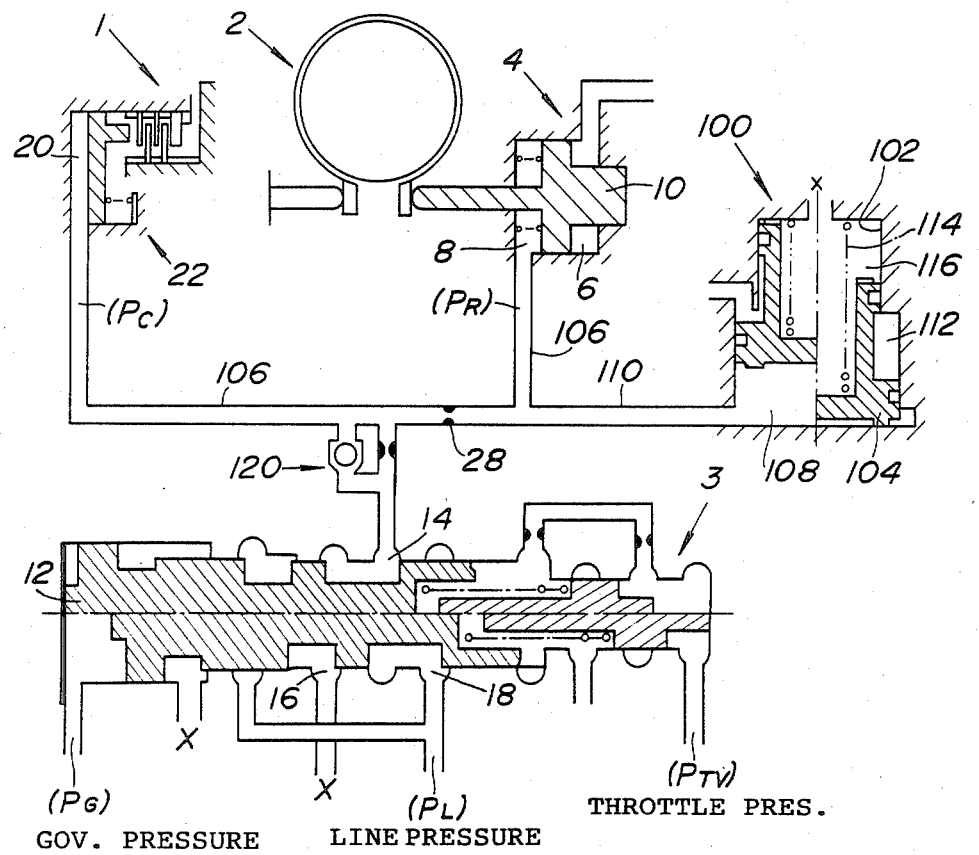
FIG. 10 shows a second embodiment of the present invention.

FIG. 10 shows a second embodiment of the present invention. In this arrangement a one-way flow restriction 120 arrangement is disposed between port 14 and the chambers 8 and 20 while a fixed flow restriction 28 is disposed between the one-way flow restriction and the release chamber 8 of the band brake servo 4. An accumulator 100 is, in this embodiment, connected to the fluid circuit 106 at a location between the flow restriction 28 and the release chamber 8. With this connection the chamber 108 of the accumultor is placed in unrestricted fluid communication with the the release chamber and in restricted communication with chamber 20 of the front clutch servo 22.

The operational characteristics of this arrangement are shown in FIGS. 11 and 12.

As shown in FIG. 11 when a 3-2 downshift occurs at low vehicle speed when the shift valve assumes its downshift position and establishes fluid communication between ports 14 and 16, the drainage of hydraulic fluid from chamber 20 of the front clutch servo 22 is restricted by the common one-way orifice 120. Although this one-way orifice has a similar effect on the draining of the release chamber 8, the provision of the orifice 28 and the accumulator 100 reduce the rate at which the pressure in the release chamber drops 8 whereby, as shown in FIG. 11, the phenomenon wherein the transmission tends to assume a partially locked condition which brakes the engine sufficiently to prevent the over-revving which induces the shift shock encountered with the FIG. 2 prior art, occurs. Viz., as shown, the release pressure ($P_R$) lowers in a stage-wise manner so that over time t1 the pressure in the release chamber lowers as shown by $\alpha 3$ and induces the torque transmitted by the brand brake to increase slowly as shown by $\beta 3$. On the other hand, the pressure ($P_C$) in chamber 20 lowers over time period t1 in manner indicated by $\alpha 4$. Thus the torque transmitted by the front clutch reduces as shown by $\beta 4$. Thus, as both elements are still trasmitting some torque at this time the above mentioned partial locking of the transmission occurs. Under these conditions the engine speed rises desirably as shown, and the output shaft torque curve shows a greatly reduced tendancy to be reduced. Thus shift shock is obviated.

On the other hand, if the downshift occurs at high vehicle speed then as shown in FIG. 12, the provision of orifice 28 causes an elevation (P'a) in the level at which the $\alpha 3$ section of the ($P_R$) depressurization characteristics terminate which is larger than the pressure level at which the $\alpha 4$ section of the front clutch depressurization characteristics terminate. Further, as shown the torque transmission characteristics of the band brake 2 steadily increase as shown by $\beta 3$ while the corresponding characteristics of the front clutch 1 exhibit a sudden reduction over the same time period. As a result the engine speed curve is such as to increase to a new level without any sharp peaks. Accordingly, the output shaft torque does not become negative and the generation of shift shock is avoided.

Although the first embodiment has been discussed in terms of upshifting while the second one in terms of downshifting, it will be obvious to those skilled in that art to which the present invention belongs that similar advantageous results occur when the reverse shifts are effected.

With the second embodiment due the provision of a common orifice (one-way orifice 120) the the variations in engagement/disengagement characteristics which are apt to occur with the passing of time and change in temperature are offset ensuring prolonged reliable transmission operation.

What is claimed is:

1. In a transmission for an automotive vehicle:
  a first friction element, said first friction element having a first chamber which when supplied with hydraulic pressure causes said first friction element to assume an engaged condition;
  a second friction element, said second friction element having a second chamber which when supplied with hydraulic pressure induces said second friction element to assume a released condition;
  said transmission being arranged so that a first speed ratio is produced when said first and second friction elements are released and engaged respectively, and a second speed ratio is produced when said first and second friction elements are engaged and released respectively;
  a shift valve, said shift valve having a valve element which establishes communication between a source of hydraulic pressure and a port when in an upshift position and communication between the port and a drain when in a downshift position;
  a fluid circuit which interconnects said port and said first and second chambers;
  an accumulator for reducing shift shock having a third chamber in fluid communication with said fluid circuit; and
  a flow restrictor fluidly disposed in said fluid circuit between said port and said second chamber.

2. A transmission as claimed in claim 1, wherein said accumulator communicates with said fluid circuit so that fluid communication between said accumulator and said first chamber is not restricted by said flow restrictor, and fluid communication between said accumulator and said second chamber is unrestricted by said flow restrictor.

3. A transmission as claimed in claim 1, wherein said accumulator communicates with said fluid circuit so that fluid communication between said accumulator and said first chamber is restricted by said flow restrictor, and fluid communication between said accumulator and said second chamber is unrestricted by said flow restrictor.

4. A transmission as claimed in claim 1, further comprising a one-way flow restriction, said one-way flow restriction being disposed in said fluid circuit at a location between said port and said flow restriction.

5. A transmission as claimed in claim 4, wherein said flow restriction and said one-way flow restriction are arranged serially between said port and said second chamber.

6. A transmission as claimed in claim 1, wherein said accumulator comprises a stepped bore in which a stepped piston is disposed, said stepped piston defining said third chamber in said stepped bore, said stepped piston also defining a fourth chamber in said stepped bore, said fourth chamber being supplied with a control pressure which tends to move said stepped piston in a direction in said stepped bore which reduces the the volume of said third chamber.

7. A transmission as claimed in claim 1, wherein said shift valve includes a fifth chamber, said fifth chamber being communicated with a source of hydraulic pressure the magnitude of which varies with vehicle speed, said shift valve being arranged so that when the pressure in said fifth chamber exceeds a predetermined level said valve element moves from said downshift position to said upshift position.

8. A transmission as claimed in claim 1, wherein said second friction element includes:
  a second valve element; and
  a sixth chamber, said valve element being exposed to said sixth chamber in a manner that when said sixth chamber is pressurized with hydraulic fluid said second friction element is driven by said second valve element into its engaged state, said valve element and said sixth chamber being arranged so that when said second chamber is pressurized by said shift valve assuming said upshift position, said second friction element is forced to assume its released condition irrespective of the pressurization of said sixth chamber.

* * * * *